United States Patent
Kim

(10) Patent No.: US 9,805,707 B2
(45) Date of Patent: Oct. 31, 2017

(54) SOUND ABSORBING AND INSULATING MATERIAL AND METHOD FOR MANUFACTURING THE SAME

(71) Applicant: Hyundai Motor Company, Seoul (KR)

(72) Inventor: Keun Young Kim, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/106,099

(22) PCT Filed: Feb. 27, 2014

(86) PCT No.: PCT/KR2014/001601
§ 371 (c)(1),
(2) Date: Jun. 17, 2016

(87) PCT Pub. No.: WO2015/093684
PCT Pub. Date: Jun. 25, 2015

(65) Prior Publication Data
US 2017/0032776 A1    Feb. 2, 2017

(30) Foreign Application Priority Data
Dec. 19, 2013    (KR) .......................... 10-2013-0159412

(51) Int. Cl.
*G10K 11/162*    (2006.01)
*B60R 13/08*    (2006.01)
(Continued)

(52) U.S. Cl.
CPC .......... *G10K 11/162* (2013.01); *B29C 70/504* (2013.01); *B32B 37/14* (2013.01);
(Continued)

(58) Field of Classification Search
CPC .. G10K 11/162; G10K 11/168; E04B 1/8409; E04B 2/02; E04B 2001/8461; E04B 8001/8466; E04B 2001/8471
(Continued)

(56) References Cited

U.S. PATENT DOCUMENTS 5,923,002 A * 7/1999 McGrath ................... B32B 5/26
                                                                 181/290
7,137,477 B2    11/2006 Keller et al.
(Continued)

FOREIGN PATENT DOCUMENTS

JP    2002-287767 A    10/2002
JP    2005-335279 A    12/2005
(Continued)

OTHER PUBLICATIONS

International Search Report—PCT/KR2014/001601, dated Mar. 18, 2014.
(Continued)

*Primary Examiner* — Forrest M Phillips
(74) *Attorney, Agent, or Firm* — Mintz Levin Cohn Ferris Glovsky and Popeo, P.C.; Peter F. Corless

(57) ABSTRACT

The present invention relates to a sound absorbing and insulating material and a method for manufacturing the same, more particularly to a sound absorbing and insulating material obtained by impregnating a polyimide binder into a nonwoven fabric formed of a heat-resistant fiber, having superior sound-absorbing property, flame retardancy, heat resistance and heat resistance, thus being applicable to parts maintained at high temperatures of 300° C. as well as at room temperature and moldability due to the use of the polyimide binder, and a method for manufacturing the same.

26 Claims, 5 Drawing Sheets

(51) Int. Cl.
*F02B 77/13* (2006.01)
*B29C 70/50* (2006.01)
*B32B 37/14* (2006.01)
*B29K 79/00* (2006.01)
*B29K 105/08* (2006.01)
*B29L 31/30* (2006.01)

(52) U.S. Cl.
CPC .......... *B60R 13/08* (2013.01); *B60R 13/0838* (2013.01); *B60R 13/0876* (2013.01); *F02B 77/13* (2013.01); *B29K 2079/08* (2013.01); *B29K 2105/0854* (2013.01); *B29L 2031/30* (2013.01); *B32B 2305/20* (2013.01); *B32B 2377/00* (2013.01); *B32B 2605/00* (2013.01)

(58) Field of Classification Search
USPC ........................................................ 181/290
See application file for complete search history.

(56) References Cited

U.S. PATENT DOCUMENTS

| | | | | |
|---|---|---|---|---|
| 8,387,748 | B2* | 3/2013 | Richardson, III | ........ B32B 5/18 181/284 |
| 8,770,169 | B2* | 7/2014 | Koyama | ................. F02B 77/13 123/195 C |
| 2010/0229517 | A1 | 9/2010 | Fujihara | |
| 2011/0139542 | A1* | 6/2011 | Borroni | ................... B32B 3/266 181/290 |
| 2011/0253474 | A1* | 10/2011 | Castagnetti | ......... B60R 13/0815 181/290 |

FOREIGN PATENT DOCUMENTS

| | | | | |
|---|---|---|---|---|
| JP | 2006-138935 | * | 6/2006 | .......... G10K 11/162 |
| JP | 2006-138935 | A | 6/2006 | |
| JP | 2007-039826 | A | 2/2007 | |
| JP | 2007-138953 | A | 6/2007 | |
| JP | 2008-050611 | A | 3/2008 | |
| JP | 2012-144818 | A | 8/2012 | |
| KR | 2006-0111330 | A | 10/2006 | |
| WO | 2005/019783 | A1 | 3/2005 | |
| WO | 2009054349 | A1 | 4/2009 | |
| WO | 2009/063723 | A1 | 5/2009 | |
| WO | 2011/055530 | A1 | 5/2011 | |

OTHER PUBLICATIONS

International Preliminary Report on Patentability and Written Opinion for International Patent Application No. PCT/KR2014/001601, dated Jun. 21, 2016, 11 pages.

* cited by examiner

SOUND ABSORBING AND INSULATING
MATERIAL AND METHOD FOR
MANUFACTURING THE SAME

CROSS-REFERENCE TO RELATED
APPLICATIONS

This application claims the benefit of International Application No. PCT/KR2014/001601, filed Feb. 27, 2014, which also claims under 35 U.S.C. §119, the priority of Korean Patent Application No. 10-2013-0159412, filed on Dec. 19, 2013, in the Korean Intellectual Property Office, the disclosure of which is incorporated herein by reference in its entirety.

BACKGROUND (a) Technical Field

The present invention relates to a sound absorbing and insulating material and a method for manufacturing the same, more particularly to a sound absorbing and insulating material obtained by impregnating a polyimide binder into a nonwoven fabric formed of a heat-resistant fiber, having superior sound-absorbing property, flame retardancy, heat resistance and heat resistance, thus being applicable to parts maintained at high temperatures of 300° C. as well as at room temperature and moldability due to the use of the polyimide binder, and a method for manufacturing the same.

(b) Background Art

Noise, as an unwanted side effect of industrial development, causes gradually more damages. Accordingly, various methods have been provided to prevent noise. As a way of such noise prevention, researches for developing new sound absorbing and insulating materials capable of arresting, absorbing or insulating sound are conducted in various ways.

Representative industrial sectors requiring sound absorbing and insulating materials include electric appliances such as an air conditioner, a refrigerator, a washing machine, a lawn mower, and the like, transportation such as an automobile, a ship, an airplane, and the like, construction materials such as a wall material, a flooring material, and the like, and so forth. The sound absorbing and insulating material is required in other various industrial fields, too. In general, the sound absorbing and insulating materials used in industries require, in addition to good sound-absorbing property, reduced weight, flame retardancy, heat resistance and heat-insulating property, depending on their applications. Especially, flame retardancy and heat resistance may be further required for sound absorbing and insulating materials used in engines, exhaust systems, and the like where high temperature of 300° C. or greater is maintained. At present, an aramid fiber, a polyimide fiber and an oxidized polyacrylonitrile (oxi-PAN) fiber are gaining attentions for sound absorbing and insulating materials having superior heat resistance.

In addition, in order to provide functionalities such as flame retardancy, water repellency, and the like to a sound absorbing and insulating material, many sound absorbing materials wherein a nonwoven fabric containing aramid fibers and a functional skin material are stacked have been developed.

For example, Korean Patent Publication No. 2007-0033310 discloses a flame-retardant sound absorbing material wherein a nonwoven fabric layer in which a heat-resistant short aramid fiber and a short thermoplastic polyester fiber are bridged and a skin material layer formed of a wetlaid nonwoven fabric consisting of a short aramid fiber are stacked.

In addition, Japanese Patent Publication No. 2007-0039826 discloses a water-repellent sound absorbing material wherein a nonwoven fabric layer of a heat-resistant short aramid fiber or a blend of a short aramid fiber and a short thermoplastic polyester fiber and a skin material layer treated with a water repellent are stacked.

Further, Japanese Patent Publication No. 2007-0138953 discloses a heat-resistant sound absorbing material wherein a nonwoven fabric layer consisting of a heat-resistant aramid fiber and a skin material layer formed of a fiber sheet containing a heat-resistant aramid fiber are stacked.

Since the sound absorbing materials described above have a structure wherein a skin material layer is laminated on one side of a nonwoven fabric to provide functionalities such as flame retardancy, water repellency and the like, a hot pressing process for integrating the nonwoven fabric layer and the skin material layer is necessary. Consequently, the overall process is complicated and troublesome, and a flame retardant, a water repellent, etc. included as additives may cause production of toxic gases as a result of combustion during the hot pressing process. In addition, deformation of the internal structure of the nonwoven fabric that may occur during the hot pressing process can lead to deterioration of sound-absorbing property.

SUMMARY

In order solve the above-described problem of the existing art, the inventors of the present invention have researched for a long time to develop a new sound absorbing and insulating material having superior sound-absorbing property, flame retardancy, heat resistance and heat-insulating property and moldability. As a result, they have developed a new sound absorbing and insulating material, wherein a polyimide binder is uniformly distributed and attached on the yarn surface of a nonwoven fabric having irregular micro cavities with a complicated three-dimensional labyrinth structure and maintains the three-dimensional structure inside the nonwoven fabric by maintaining the micro cavities of the nonwoven fabric or further forming micro cavities, thereby improving the physical properties of the nonwoven fabric including sound-absorbing property and allowing molding into a desired shape during the curing of the binder.

Accordingly, the present invention is directed to providing a sound absorbing and insulating material having superior sound-absorbing property, flame retardancy, heat resistance and heat-insulating property and having a polyimide binder impregnated into a nonwoven fabric formed of a heat-resistant fiber.

The present invention is also directed to providing a method for manufacturing a sound absorbing and insulating material by immersing a nonwoven fabric formed of a heat-resistant fiber in a binder containing a monomer for polymerization of polyimide and converting the monomer to polyimide by performing polymerization and curing.

The present invention is also directed to providing a method for reducing noise by using the sound absorbing and insulating material in a noise-generating device.

In one aspect, the present invention provides a sound absorbing and insulating material including: a nonwoven fabric containing 30-100 wt % of a heat-resistant fiber; and a polyimide binder impregnated into the nonwoven fabric and present in the same layer as the nonwoven fabric, being distributed and attached on a yarn surface of the nonwoven fabric and maintaining the three-dimensional structure inside the nonwoven fabric by maintaining or further forming micro cavities of the nonwoven fabric.

In another aspect, the present invention provides a method for manufacturing a sound absorbing and insulating material, including: a) a step of immersing a nonwoven fabric containing 30-100 wt % of a heat-resistant fiber in a binder solution in which polyamic acid is dispersed; b) a step of recovering the polyamic acid-impregnated nonwoven fabric from the binder solution; and c) a step of converting the polyamic acid to polyimide by curing the recovered nonwoven fabric.

In another aspect, the present invention provides a method for reducing noise of a noise-generating device, including: i) a step of checking the three-dimensional shape of a noise-generating device; ii) a step of preparing and molding a sound absorbing and insulating material so as to correspond to the three-dimensional shape of the device partially or entirely; and iii) a step of bringing the sound absorbing and insulating material adjacent to the noise-generating device.

The sound absorbing and insulating material of the present invention, wherein the polyimide binder is impregnated into the nonwoven fabric formed of a heat-resistant fiber, is advantageous in that the sound absorbing and insulating material has superior sound-absorbing property, flame retardancy, heat resistance and heat-insulating property and it can be shaped into a three-dimensional shape due to the polyimide binder.

In addition, the sound absorbing and insulating material of the present invention is advantageous in that a hot pressing process for integrating a nonwoven fabric with a skin material is not necessary unlike the existing sound absorbing and insulating material having a stacked structure.

Further, the sound absorbing and insulating material of the present invention is advantageous in that, if the sound absorbing and insulating material is prepared by further including a functional additive in the binder solution, it is not necessary to stack a skin material to provide functionality to the sound absorbing and insulating material.

The sound absorbing and insulating material of the present invention is also advantageous in that, since flame retardancy, heat resistance and heat-insulating property are superior in addition to sound-absorbing property, the sound absorbing and insulating material is not deformed or denatured even when used in a noise-generating device maintained at high temperatures of 300° C. or greater.

Further, the present invention is advantageous in that the sound absorbing and insulating material can be molded into a desired shape in the state where the polyamic acid is impregnated.

In addition, the sound absorbing and insulating material of the present invention is advantageous in that, since a nonwoven fabric formed of a heat-resistant fiber is used, thermal deformation of the nonwoven fabric due to the reaction heat of thermal curing does not occur even when the thermosetting resin polyimide is used as the binder.

Accordingly, the sound absorbing and insulating material of the present invention is useful as a sound absorbing and insulating material in applications requiring arresting, absorbing or insulating of sound, including electric appliances such as an air conditioner, a refrigerator, a washing machine, a lawn mower and the like, transportation such as an automobile, a ship, an airplane and the like, construction materials such as a wall material, a flooring material, and the like, and so forth. The sound absorbing and insulating material of the present invention is useful as a sound absorbing and insulating material for a noise-generating device where high temperature of 300° C. or greater is maintained. In particular, when the sound absorbing and insulating material of the present invention is used in an automobile, it may be closely attached to a noise-generating device of the automobile such as an engine, an exhaust system, and the like, as being provided with a distance from the noise-generating device or being molded as a part of the noise-generating device.

BRIEF DESCRIPTION OF DRAWINGS

FIG. 1A is an image of a nonwoven fabric before impregnation of a binder, FIG. 1B is an image of a nonwoven fabric in which 20 parts by weight of a binder has been impregnated based on 100 parts by weight of the nonwoven fabric, and FIG. 1C is an image of a nonwoven fabric in which 50 parts by weight of a binder has been impregnated based on 100 parts by weight of the nonwoven fabric.

FIG. 2A is an image of a sound absorbing and insulating material molded for use in an automobile engine, and FIG. 2B shows an example wherein a sound absorbing and insulating material is applied in a part of an automobile engine.

FIG. 3A is an image of a sound absorbing and insulating material molded for use in a lower part of an automobile, and FIG. 3B shows an example wherein a sound absorbing and insulating material is attached to a lower part of an automobile.

DETAILED DESCRIPTION

The present invention relates to a sound absorbing and insulating material and a method for manufacturing same. The sound absorbing and insulating material of the present invention has superior sound-absorbing property, flame retardancy, heat resistance and heat-insulating property and is moldable into a desired three-dimensional shape using a binder as being present in the same layer as a heat-resistant fiber nonwoven fabric.

In an aspect, the present invention provides a sound absorbing and insulating material including: a nonwoven fabric containing 30-100 wt % of a heat-resistant fiber; and a polyimide binder impregnated into the nonwoven fabric and present in the same layer as the nonwoven fabric, being distributed and attached on the yarn surface of the nonwoven fabric and maintaining the three-dimensional structure inside the nonwoven fabric by maintaining or further forming micro cavities of the nonwoven fabric.

In an exemplary embodiment of the present invention, the heat-resistant fiber may have a limiting oxygen index (LOI) of 25% or greater and a heat resistance temperature of 150° C. or greater, specifically 300° C. or greater.

In an exemplary embodiment of the present invention, the heat-resistant fiber may be one or more selected from a group consisting of an aramid fiber, oxidized polyacrylonitrile (oxi-PAN) fiber, a polyimide (PI) fiber, a polybenzimidazole (PBI) fiber, a polybenzoxazole (PBO) fiber, a metallic fiber, a carbon fiber, a glass fiber, a basalt fiber, a silica fiber and a ceramic fiber. In another exemplary embodiment of the present invention, the heat-resistant fiber may be an aramid fiber or an oxidized polyacrylonitrile (oxi-PAN) fiber having a fineness of 1-15 denier and a yarn length of 20-100 mm.

In an exemplary embodiment of the present invention, the nonwoven fabric may have a thickness of 3-20 mm and a density of 100-2000 g/m$^2$.

In another exemplary embodiment of the present invention, the nonwoven fabric may have a density of 200-1200 g/m$^2$.

In an exemplary embodiment of the present invention, the nonwoven fabric may be impregnated with a polyimide binder having a weight-average molecular weight of 10,000-200,000.

In another exemplary embodiment of the present invention, 1-300 parts by weight of the polyimide binder is impregnated based on 100 parts by weight of the nonwoven fabric. In an exemplary embodiment of the present invention, the sound absorbing and insulating material may be molded to correspond to the a three-dimensional shape of an object to which the sound absorbing and insulating material is applied.

In an exemplary embodiment of the present invention, the sound absorbing and insulating material may be formed as a single layer or multiple layers.

In another exemplary embodiment of the present invention, the sound absorbing and insulating material may be used as a sound absorbing and insulating material for an automobile.

Figure 1A:
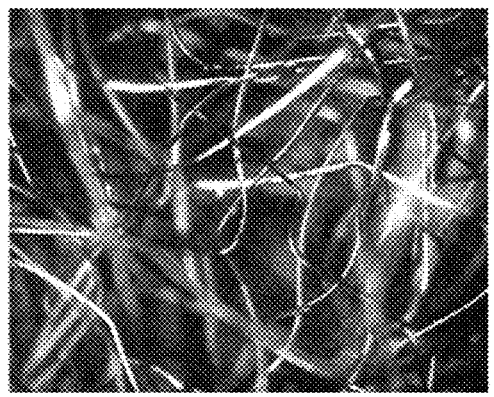
FIGS. 1A-1C show electron microscopic images (×300) of a nonwoven fabric before and after impregnation of a binder.
Figure 1B:
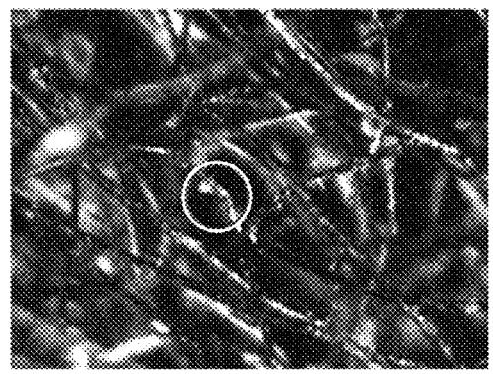
Figure 1C:
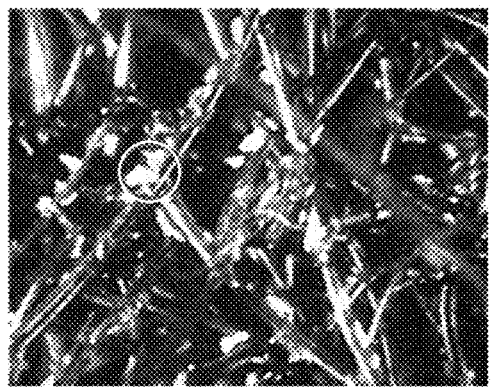

The structure of the sound absorbing and insulating material according to the present invention is described in more detail referring to FIGS. 1A-1C.

FIGS. 1A-1C show electron microscopic images showing the three-dimensional structure inside a nonwoven fabric before and after impregnation of a polyimide binder.

FIG. 1A is an electron microscopic image showing the internal structure of a nonwoven fabric before impregnation of a polyimide binder. It can be seen that heat-resistant fiber yarns cross each other to form irregular micro cavities. FIG. 1B and FIG. 1C are electron microscopic images after impregnation of a polyimide binder into the nonwoven fabric. It can be seen that the binder is finely and uniformly distributed and attached to the heat-resistant fiber yarns. Also, it can be seen that the content of the binder on the yarn surface increases as the content of the binder increases.

Although there may be differences depending on the preparation method, fibers are randomly arranged three-dimensionally in a nonwoven fabric. Accordingly, the pore structure inside a nonwoven fabric tends to be a very complicated labyrinth structure (labyrinth system) wherein regularly or irregularly arranged fibers are three-dimensionally interconnected rather than bundles of independent capillary tubes. That is to say, the nonwoven fabric used in the present invention has irregular micro cavities formed as the yarns formed of the heat-resistant fiber loosely cross each other.

When a polyimide binder is impregnated into the nonwoven fabric, the polyimide is finely and uniformly distributed and attached to the surface of the nonwoven fabric, thereby forming much finer micro cavities than before the impregnation. The formation of fine micro cavities in the internal structure of the nonwoven fabric means increased resonance of noise and thus improved sound-absorbing property. In particular, because the three-dimensional network structure of polyimide is formed by curing of polyamic acid, the sound-absorbing property can be further improved since more fine micro cavities can be formed inside the nonwoven fabric.

Accordingly, since the nonwoven fabric can maintain the intrinsic three-dimensional shape as the polyimide binder is uniformly impregnated into the nonwoven fabric and, additionally, since more fine micro cavities can be formed as the polyamic acid prepolymer is converted to the polyimide through curing, the sound absorbing and insulating material of the present invention has remarkably improved sound-absorbing performance due to the maximized noise absorption through increased resonance in the nonwoven fabric.

As seen from the electron microscopic images of FIGS. 1A-1C, in the sound absorbing and insulating material of the present invention, the polyimide binder is uniformly dispersed and distributed on the surface of the heat-resistant fiber yarns constituting the nonwoven fabric.

Hereinafter, the components of the sound absorbing and insulating material according to the present invention having the internal structure described above are described in more detail.

In the present invention, a heat-resistant fiber is used as the main fiber constituting the nonwoven fabric.

The heat-resistant fiber may be any one having superior durability and capable of enduring high-temperature and ultrahigh-temperature conditions. Specifically, the heat-resistant fiber may be one having a limiting oxygen index (LOI) of 25% or greater and a heat resistance temperature of 150° C. or greater. More specifically, the heat-resistant fiber may be one having a limiting oxygen index (LOI) of 25-80% and a heat resistance temperature of 300-30000° C. Most specifically, the heat-resistant fiber may be one having a limiting oxygen index (LOI) of 25-70% and a heat resistance temperature of 300-1000° C. And, the heat-resistant fiber may have a fineness of 1-15 denier, specifically 1-6 denier and a yarn length of 20-100 mm, specifically 40-80 mm. If the yarn length is too short, the binding strength of the nonwoven may become weak because of difficulty in yarn bridging during needle punching. And, if the yarn length is too long, the yarn may not be transferred as desired during carding although the nonwoven may have good binding strength.

The heat-resistant fiber may be a 'super fiber' as commonly called in the related art. Specifically, the super fiber may be one or more selected from a group consisting of an aramid fiber, an oxidized polyacrylonitrile (oxi-PAN) fiber, a polyimide (PI) fiber, a polybenzimidazole (PBI) fiber, a polybenzoxazole (PBO) fiber, a metallic fiber, a carbon fiber, a glass fiber, a basalt fiber, a silica fiber, a ceramic fiber, and the like.

Specifically, an aramid fiber or an oxidized polyacrylonitrile (oxi-PAN) fiber may be used as the heat-resistant fiber in the present invention.

In the present invention, the polyimide binder is impregnated into the nonwoven fabric and present in the same layer as the nonwoven fabric so as to maintain the three-dimensional structure inside the nonwoven fabric. To 'maintain the three-dimensional structure inside the nonwoven fabric' means that the binder is impregnated into the nonwoven fabric and uniformly distributed and attached on the yarn surface of the nonwoven fabric, thereby maintaining the three-dimensional structure inside the nonwoven fabric by maintaining the micro cavities of the nonwoven fabric or further forming micro cavities.

In general, a binder refers to a material used for adhesion or bonding of two materials. But, in the present invention, the binder refers to a material impregnated into a nonwoven fabric formed of a heat-resistant fiber.

In the present invention, polyimide is used as a binder impregnated into the nonwoven fabric. A general synthetic process of polyimide is shown in Scheme 1. According to the preparation method of Scheme 1, polyamic acid represented by Chemical Formula 3 is prepared by polymerizing an acid dianhydride monomer represented by Chemical Formula 1 and a diamine monomer represented by Chemical Formula 2. Then, polyimide represented by Chemical Formula 4 may be prepared by converting the polyamic acid through imidization.

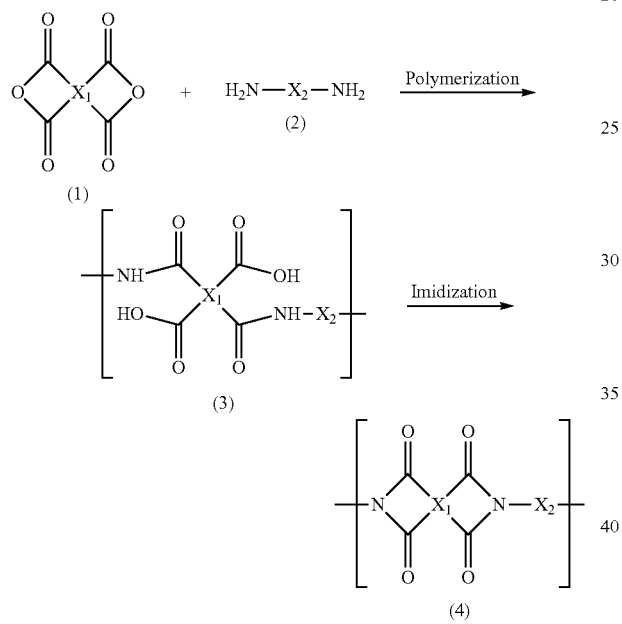

[Scheme 1]

In Scheme 1, $X_1$ is a tetravalent aliphatic or aromatic hydrocarbon group and $X_2$ is a divalent aliphatic or aromatic hydrocarbon group.

In Scheme 1, $X_1$ is a tetravalent group derived from an acid dianhydride monomer and specific examples are as follows:

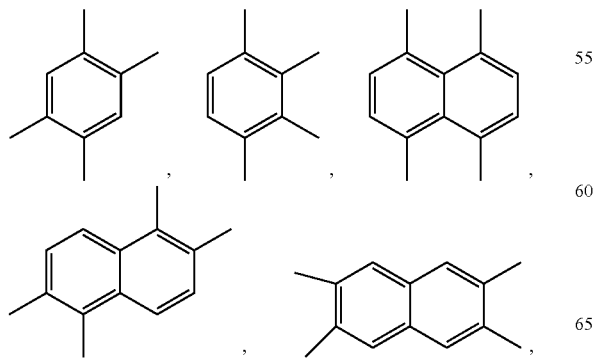

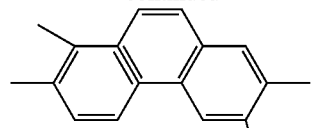
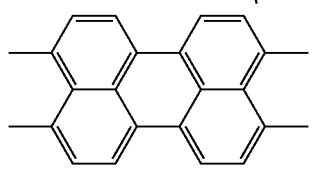
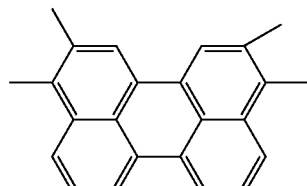
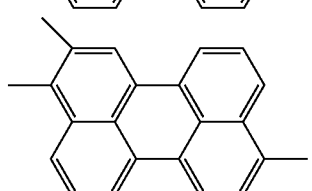
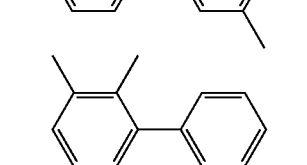
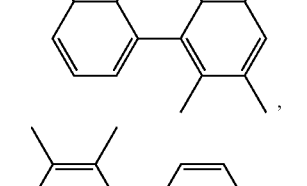
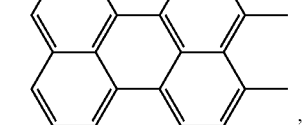
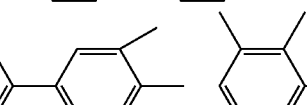
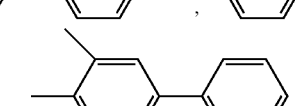
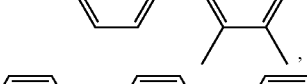
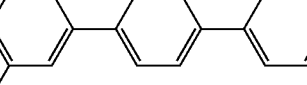
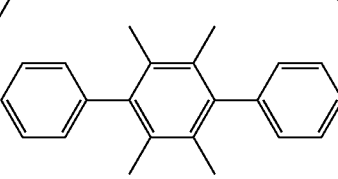

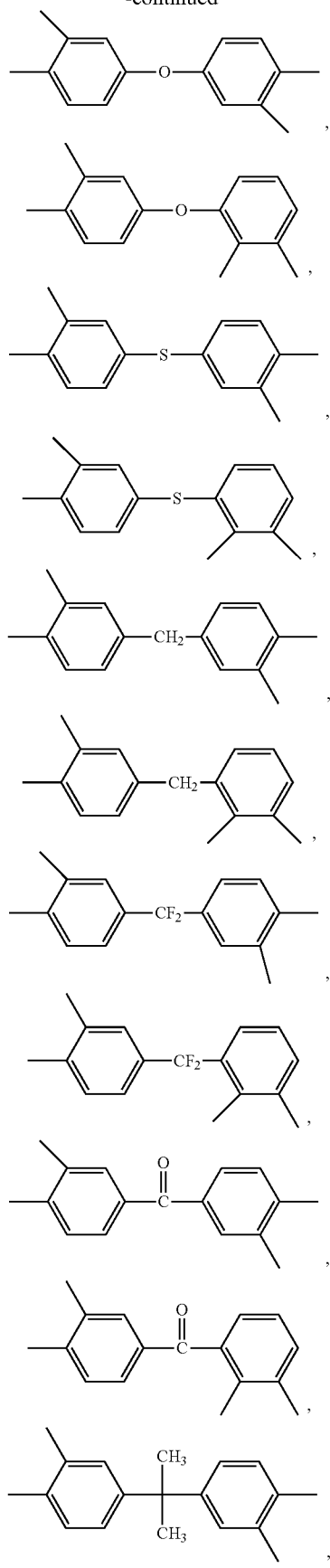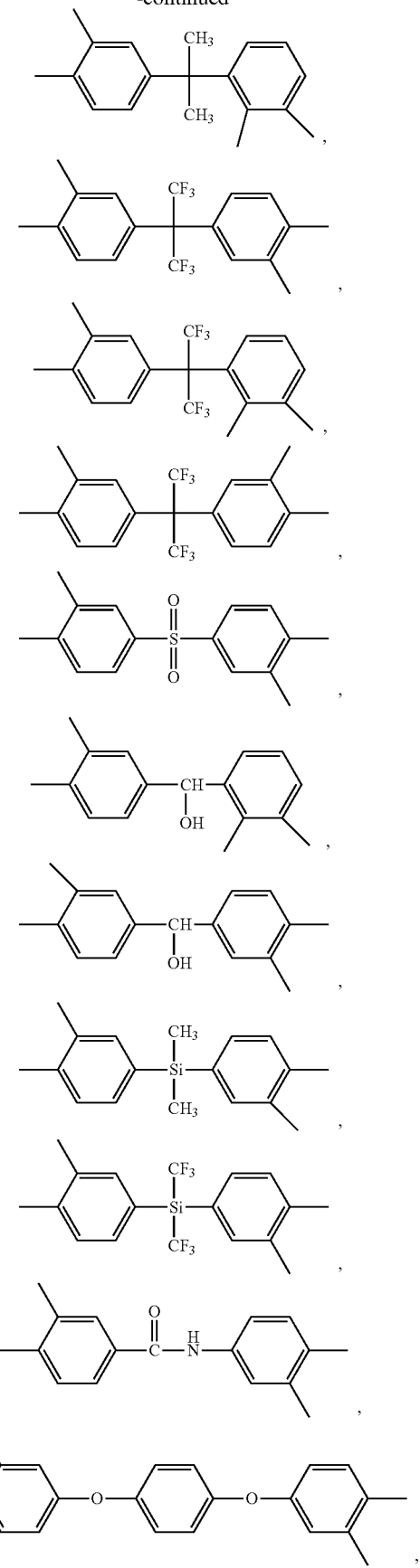

-continued
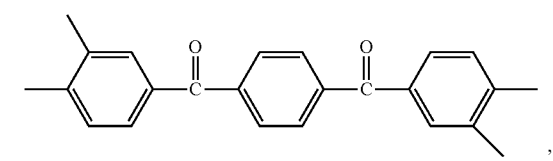,
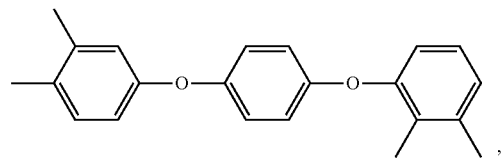,
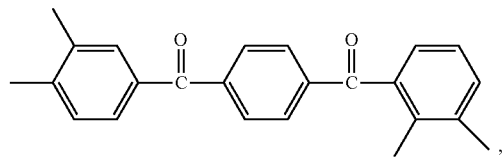,
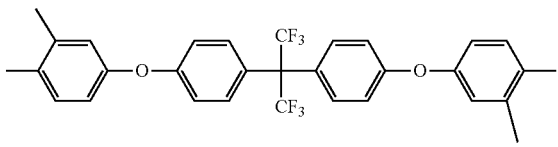,
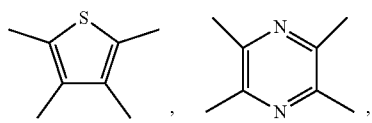,
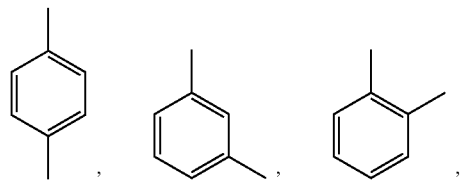,
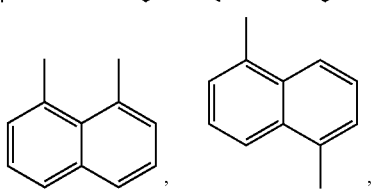,
Further, in Scheme 1, $X_2$ is a divalent derived from a diamine monomer and specific examples are as follows:
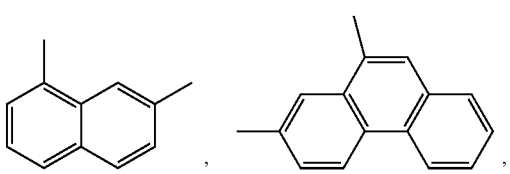,
-continued
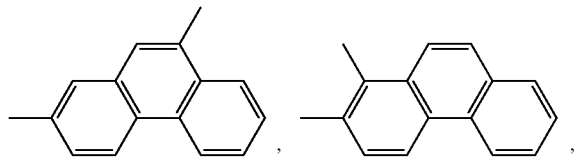,
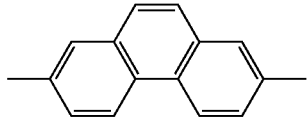,
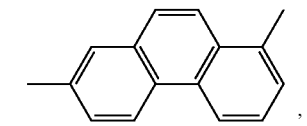,
,
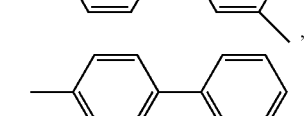,
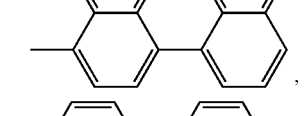,
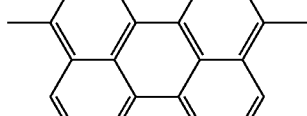,
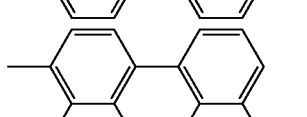,
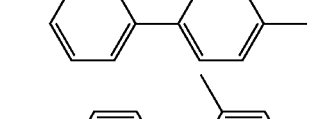,
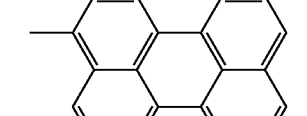,
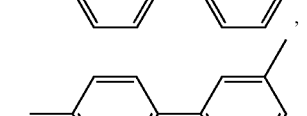,
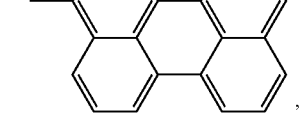,
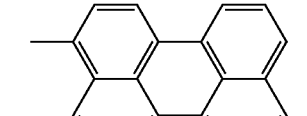,
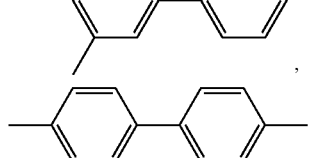,

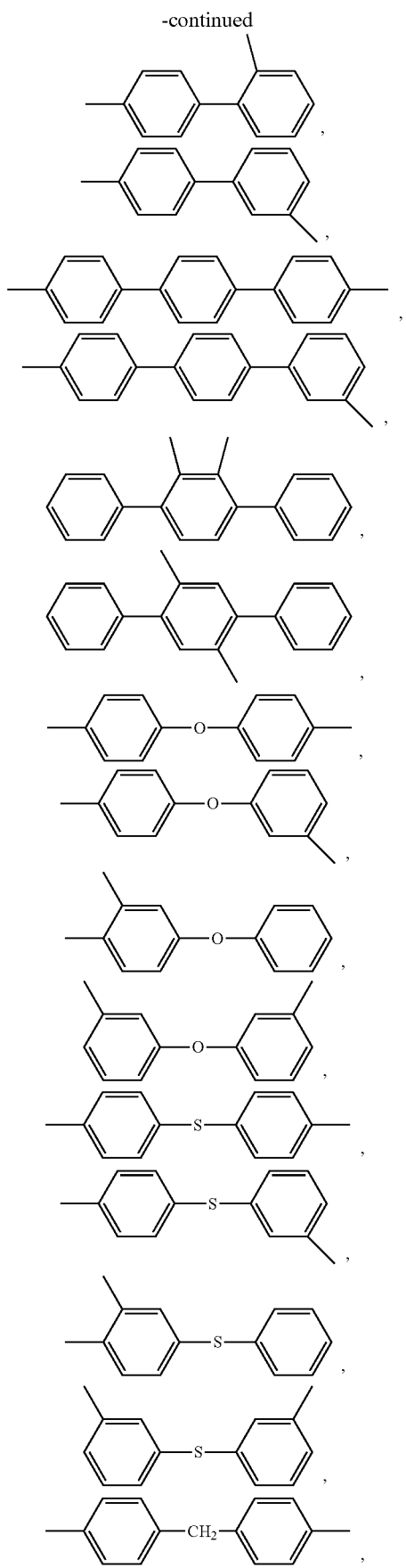
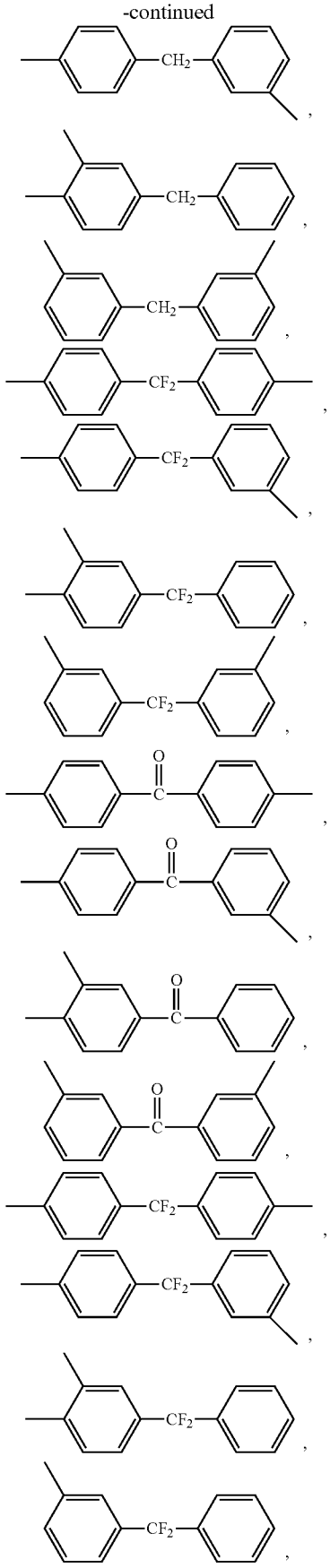

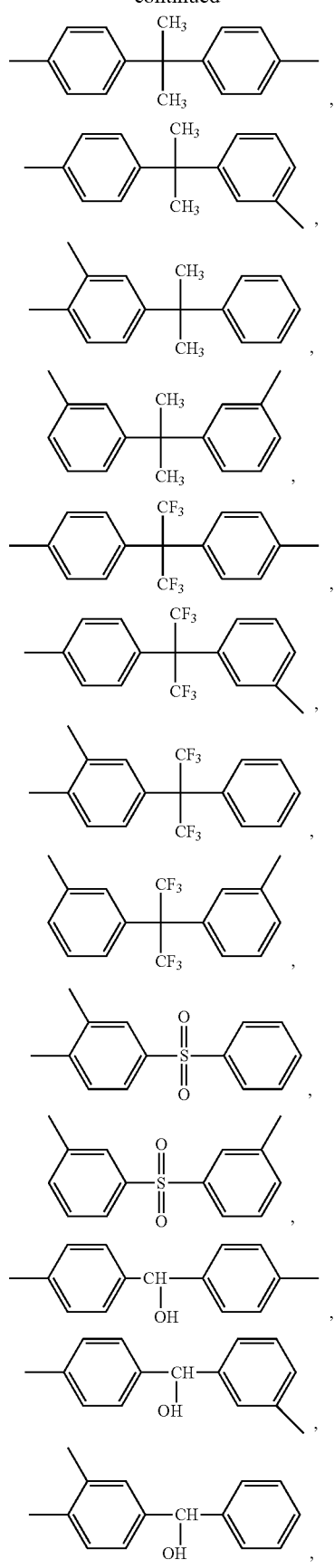
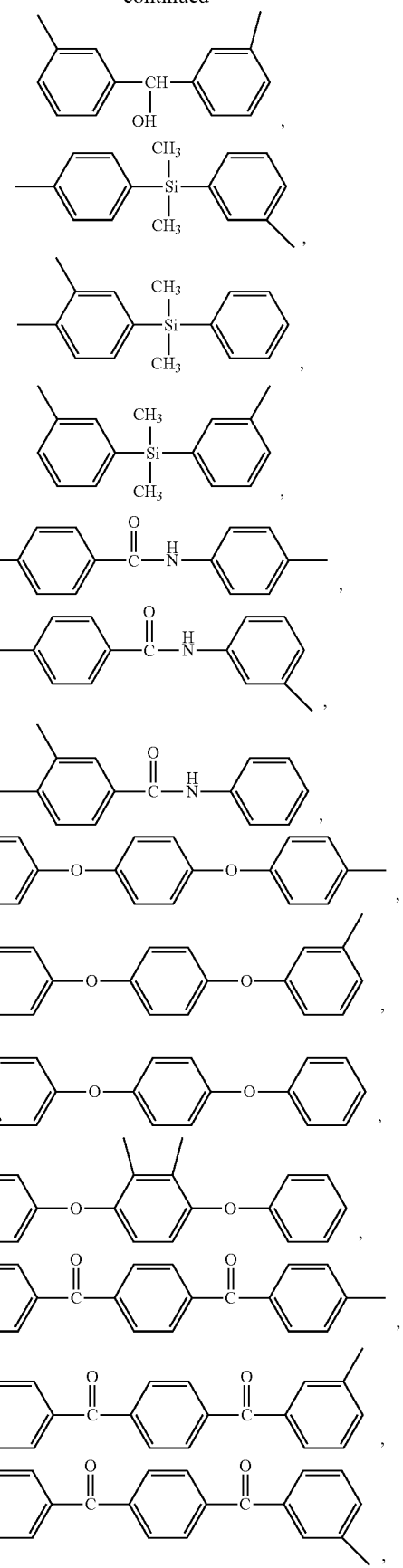

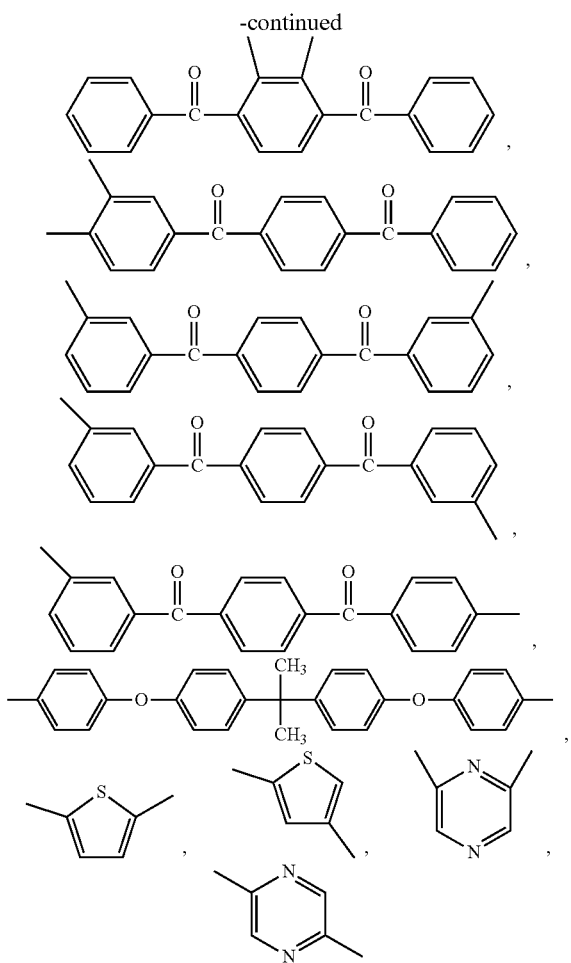

The polyimide used as the binder in the present invention is a curing product prepared from imidization of the polyamic acid. The cured polyimide has a three-dimensional network structure. Accordingly, as the polyamic acid in the internal structure of the nonwoven fabric is cured to polyimide, the polyimide binder spontaneously forms a network structure and generates further micro cavities. As a result, more fine micro cavities are formed inside the nonwoven fabric and sound-absorbing performance can be improved further.

In addition, the polyimide is a representative thermosetting resin and has entirely different physical and chemical properties from a thermoplastic heat-resistant fiber used in a nonwoven fabric such as an aramid fiber or an oxidized polyacrylonitrile (oxi-PAN) fiber. As such, when the thermosetting polyimide binder is impregnated into the nonwoven fabric formed of the thermoplastic heat-resistant fiber, an interfacial layer is formed between them due to edge-to-edge contact because of the difference in characteristics. As a result, the micro cavities of the nonwoven fabric remain open. That is to say, when the polyimide is impregnated into the nonwoven fabric formed of the heat-resistant fiber, it is possible to maintain the three-dimensional structure inside the nonwoven fabric.

Furthermore, the polyimide has the characteristics that it is curable with light, heat or a curing agent and its shape is not deformed even at high temperatures. Accordingly, when the polyimide is impregnated into the nonwoven fabric, the shape of the molded nonwoven fabric can be maintained even at high temperatures.

Accordingly, the sound absorbing and insulating material according to the present invention in which the polyimide binder is impregnated into the nonwoven fabric exhibits improved sound-absorbing performance because the three-dimensional structure inside the nonwoven fabric can be maintained as more fine micro cavities are formed or maintained inside the nonwoven fabric. In addition, it can be molded into a desired shape while the binder in the nonwoven fabric is cured and the molded shape can be maintained even at high temperatures.

The polyimide used as the binder in the present invention may be prepared by the conventional preparation method according to Scheme 1. The present invention is not particularly limited in the preparation method of the polyimide.

A general polyimide preparation method according to Scheme 1 is described in detail.

First, polyamic acid is prepared through condensation polymerization of an acid dianhydride monomer and a diamine monomer. The condensation polymerization may be performed by a commonly employed polymerization method using monomers commonly known in the art.

The acid dianhydride monomer may include an aliphatic or aromatic tetracarboxylic dianhydride. Specifically, the acid dianhydride monomer may include 1,2,3,4-cyclobutanetetracarboxylic dianhydride, 1,2,3,4-cyclopentanetetracarboxylic dianhydride, 5-(2,5-dioxotetrahydrofuryl)-3-methyl-3-cyclohexene-1,2-dicarboxylic anhydride, 4-(2,5-dioxotetrahydrofuran-3-yl)-tetralin-1,2-dicarboxylic anhydride, bicylooctene-2,3,5,6-tetracarboxylic dianhydride, pyromellitic dianhydride, 3,3',4,4'-biphenyl-tetracarboxylic dianhydride, 2,2-bis(2,3-dicarboxyphenyl)-1,1,1,3,3,3-hexafluoropropane dianhydride, 2,2-bis(3,4-dicarboxyphenyl)-1,1,1,3,3,3-hexafluoropropane dianhydride, 3,3',4,4'-benzophenonetetracarboxylic dianhydride, bis(3,4-dicarboxyphenyl) ether dianhydride, bis(3,4-dicarboxyphenyl)sulfone dianhydride, and the like. The acid dianhydride monomer may be used alone or in combination of two or more and the scope of the present invention is not limited to these monomers.

The diamine monomer may include an aliphatic or aromatic diamino compound. Specifically, the diamine monomer may include m-phenylenediamine, p-phenylenediamine, 3,4'-diaminodiphenyl ether, 4,4'-diaminodiphenyl ether, 4,4'-diaminodiphenylsulfone, 3,3'-diaminodiphenylsulfone, 2,2-bis(4-aminophenoxyphenyl)propane, 2,2-bis(4-aminophenoxyphenyl)-hexafluoropropane, 1,3-bis(4-aminophenoxy)benzene, 1,4-bis(4-aminophenoxy)benzene, 2,4-diaminotoluene, 2,6-diaminotoluene, diaminodiphenylmethane, 4,4'-diamino-2,2-dimethylbiphenyl, 2,2-bis(trifluoromethyl)-4,4'-diaminobiphenyl, and the like. The diamine monomer may be used alone or in combination of two or more and the scope of the present invention is not limited to these monomers.

The polymerization for preparing the polyamic acid may be conducted at 0-90° C. for 1-24 hours using a conventional organic solvent. As the organic solvent, a polar solvent such as m-cresol, N-methyl-2-pyrrolidone, N-ethyl-2-pyrrolidone, N,N-dimethylacetamide, N,N-dimethylformamide, dimethyl sulfoxide, and the like. may be used.

Then, the polyamic acid is converted to polyimide through imidization. The imidization reaction may be performed by a commonly employed curing method using light, heat or a curing agent. Specifically, the curing reaction may be conducted by heat-treating at 150-350° C. If necessary, an acid catalyst such as p-toluenesulfonic acid, hydroxybenzoic acid, crotonic acid, etc. or a base catalyst such as an organic amine, an organic azole, and the like may be used as an imidization catalyst to facilitate the curing.

The polyimide used as the binder in the present invention may be a conventional aliphatic or aromatic polyimide resin and may have a weight-average molecular weight of specifically 10,000-200,000. When the weight-average molecular weight of the polyimide binder is less than 10,000, polymer properties may be unsatisfactory. And, when it exceeds 200,000, impregnation may be difficult because the polyimide binder is not dissolved well in a solvent.

In addition, various additives, e.g., a flame retardant, a heat resistance improver, a water repellent, etc., may be used to provide functionalities to the sound absorbing and insulating material. Because the additive is included in the binder solution, no additional skin material for providing functionalities to the sound absorbing and insulating material is necessary.

The flame retardant may be melamine, a phosphate, a metal hydroxide, and the like. Specifically, one or more selected from a group consisting of melamine, melamine cyanurate, melamine polyphosphate, phosphazene, ammonium polyphosphate, and the like may be used as the flame retardant. More specifically, the flame retardant may be melamine, which can enhance flame retardancy and heat resistance at the same time.

The heat resistance improver may be alumina, silica, talc, clay, glass powder, glass fiber, metal powder, and the like.

One or more fluorine-based water repellent may be used as the water repellent.

In addition, additives commonly used in the art may be selected and used depending on purposes.

In another aspect, the present invention provides a method for manufacturing a sound absorbing and insulating material, including: a) a step of immersing a nonwoven fabric containing 30-100 wt % of a heat-resistant fiber in a binder solution in which polyamic acid is dispersed; b) a step of recovering the polyamic acid-impregnated nonwoven fabric from the binder solution; and c) a step of converting the polyamic acid to polyimide by curing the recovered nonwoven fabric.

In an exemplary embodiment of the present invention, the method may further include, after the step b) of recovering the nonwoven fabric, b-1) a step of molding the polyamic acid-impregnated nonwoven fabric into a desired shape.

In an exemplary embodiment of the present invention, the step b) of recovering the nonwoven fabric may include a process of taking out and compressing the polyamic acid-impregnated nonwoven fabric at a pressure of 1-20 kgf/cm$^2$, a process of taking out the polyamic acid-impregnated nonwoven fabric and evaporating a solvent by heating at 70-200° C. or a process of taking out and compressing the polyamic acid-impregnated nonwoven fabric and evaporating a solvent under the above-described conditions.

In an exemplary embodiment of the present invention, the step c) of converting the polyamic acid to polyimide may include a curing process of converting the polyamic acid to polyimide through imidization at 150-350° C.

Hereinafter, the steps of the method for manufacturing a sound absorbing and insulating material according to the present invention are described in detail.

In the step a), a nonwoven fabric formed of a heat-resistant fiber is immersed in a binder solution.

In the present invention, the nonwoven fabric is immersed in the binder solution so as to improve sound-absorbing and sound-insulating performance and to allow molding of the sound absorbing and insulating material into a desired shape.

In the binder solution into which the nonwoven fabric is immersed, polyamic acid which is a precursor to polyimide is dispersed. That is to say, in the binder solution, polyamic acid obtained from polymerization of an acid dianhydride monomer and a diamine monomer is dispersed. The monomers, conventional additives and solvent used in the polymerization of the polyamic acid are the same as described above.

In the present invention, the degree of impregnation into the nonwoven fabric can be controlled with the concentration of the binder solution. The concentration of the binder solution may be specifically 1-60 wt %, more specifically 5-30 wt % based on the content of the polyamic acid. When the concentration of the binder solution is too low, the effect desired by the present invention cannot be achieved because the amount of the binder impregnated into the nonwoven fabric is small. When the concentration of the binder solution is too high, the nonwoven fabric becomes too hard to function as a sound absorbing and insulating material.

The binder solution in which the polyamic acid is dispersed may contain one or more commonly used additive selected from a group consisting of a flame retardant, a heat resistance improver, and a water repellent, and the like. The amount of these additives may be adjusted adequately depending on purposes. When the addition amount is too small, the desired effect of addition may not be achieved. And, excessive amount may be economically unfavorable and cause undesired side effects.

In the step b), the polyamic acid-impregnated nonwoven fabric is recovered from the binder solution.

In the present invention, the step of recovering the nonwoven fabric includes a process of taking out the nonwoven fabric immersed in the binder solution and removing a solvent. This process may be performed under application of adequate heat and pressure. Specifically, the step of recovering the nonwoven fabric may include a process of taking out the polyamic acid-impregnated nonwoven fabric and controlling the content of the binder in the nonwoven fabric by compressing at a pressure of 1-20 kgf/cm$^2$. Also, the step of recovering the nonwoven fabric may include a process of taking out the polyamic acid-impregnated nonwoven fabric and evaporating a solvent by heating at 70-200° C. In addition, the step of recovering the nonwoven fabric may include a process of taking out and compressing the polyamic acid-impregnated nonwoven fabric at a pressure of 1-20 kgf/cm$^2$ and then evaporating a solvent by heating at 70-200° C.

The content of the binder included in the nonwoven fabric recovered from the binder solution is an important factor determining the size, shape and distribution of micro cavities inside the sound absorbing and insulating material. Accordingly, the sound-absorbing property and mechanical property of the sound absorbing and insulating material may be controlled therewith. The final content of the polyimide binder included in the sound absorbing and insulating material according to the present invention may be controlled to be 1-300 parts by weight, more specifically 30-150 parts by weight, based on 100 parts by weight of the nonwoven fabric.

In the step c), the polyamic acid is converted to polyimide.

Specifically, in the step c), the polyamic acid included in the recovered nonwoven fabric is converted to polyimide through curing. The curing process for conversion to polyimide may be performed using light, heat or a curing agent and conditions for the process of converting the polyamic acid to polyimide are well known in the art. When the conversion to polyimide is performed through thermal curing, it may be performed at 150-350° C. for 30 minutes to 3 hours.

After the step c), it can be confirmed from an electron microscopic image that the polyimide is uniformly distributed and attached to the yarn surface of the nonwoven fabric. The polyimide impregnated into the nonwoven fabric has a weight-average molecular weight of 10,000-200,000 g/mol.

In the present invention, the method for manufacturing a sound absorbing and insulating material may further include, after the step b) of recovering the nonwoven fabric, b-1) a step of molding the nonwoven fabric into a sound absorbing and insulating material of a desired shape.

Specifically, the method for manufacturing a sound absorbing and insulating material including the molding step b-1) may include: a) a step of immersing a nonwoven fabric containing 30-100 wt % of a heat-resistant fiber in a binder solution in which polyamic acid is dispersed; b) a step of recovering the polyamic acid-impregnated nonwoven fabric from the binder solution; b-1) a step of molding the nonwoven fabric into a desired shape; and c) a step of converting the polyamic acid to polyimide by curing the recovered nonwoven fabric.

The molding step b-1) may be performed by heat-treating at high temperature. The molding process at high temperature, which also considers the curing reaction of the thermosetting binder, is performed at 150-350° C., more preferably at 200-300° C.

The method for manufacturing a sound absorbing and insulating material may further include, before the step a), a-1) a step of forming a nonwoven fabric by a needle punching process using a heat-resistant fiber. For example, in the step a-1), an aramid nonwoven fabric having a thickness of 3-20 mm may be formed by a needle punching process of a heat-resistant aramid fiber having a fineness of 1-15 denier.

For example, the method for manufacturing a sound absorbing and insulating material according to the present invention including the step a-1) may include: a-1) a step of forming a nonwoven fabric by a needle punching process using a heat-resistant fiber; a) a step of immersing the nonwoven fabric containing 30-100 wt % of a heat-resistant fiber in a binder solution in which polyamic acid is dispersed; b) a step of recovering the polyamic acid-impregnated nonwoven fabric from the binder solution; b-1) a step of molding the nonwoven fabric into a desired shape; and c) a step of converting the polyamic acid to polyimide by curing the recovered nonwoven fabric.

The step a-1) of forming the nonwoven fabric includes a needle punching process using a heat-resistant fiber. The sound-absorbing property may vary depending on the thickness and density of the nonwoven fabric. It is expected that the sound-absorbing property will improve as the thickness and density of the nonwoven fabric are increased.

The nonwoven fabric used in the present invention may have a thickness of 3-20 mm when considering the industrial field, etc. where the sound absorbing and insulating material is used. When the thickness of the nonwoven fabric is smaller than 3 mm, the durability and moldability of the sound absorbing and insulating material may be unsatisfactory. When the thickness exceeds 20 mm, productivity may decrease and production cost may increase. Further, the density of the nonwoven fabric may be 100-2000 g/m$^2$, preferably 200-1200 g/m$^2$, more preferably 300-800 g/m$^2$, when considering performance and cost.

The nonwoven fabric is formed by stacking a web of 30-100 g/m$^2$ formed by carding 2- to 12-fold and continuously performing up-down preneedling, down-up needling and up-down needling, thereby forming physical bridges that provide the necessary thickness, binding strength and other desired physical properties. The needle used to perform the needling may be a barb-type needle, having a working blade of 0.5-3 mm and a needle length (the distance from crank outside to point) of 70-120 mm. Preferably, the needle stroke may be 30-350 times/m$^2$.

More preferably, the fineness of yarn for the nonwoven fabric may be 1.5-8.0 denier, the thickness of the pile layer may be 6-13 mm, the needle stroke may be 120-250 times/m$^2$, and the density of the nonwoven fabric may be 300-800 g/m$^2$.

The internal structure of the sound absorbing and insulating material manufactured by the method described above may be confirmed using an electron microscope. When observed with an electron microscope, the sound absorbing and insulating material of the present invention has 1-100 μm-sized micro cavities distributed inside thereof. The micro cavities are distributed regularly or irregularly with a spacing of 0.1-500 μm.

In another aspect, the present invention provides a method for reducing noise of a noise-generating device, including: i) checking a three-dimensional shape of a noise-generating device; ii) preparing and molding a sound absorbing and insulating material so as to correspond to the three-dimensional shape of the device partially or entirely; and iii) bringing the sound absorbing and insulating material adjacent to the noise-generating device.

The device refers to a noise-generating device including a motor, an engine, an exhaust system, and the like. However, the scope of the device is never limited to the motor, engine and exhaust system. The sound absorbing and insulating material may be manufactured to correspond to the three-dimensional shape of the device partially or entirely. Since the sound absorbing and insulating material of the present invention is moldable during curing of the binder, the sound absorbing and insulating material may be molded to correspond to the three-dimensional shape of the device partially or entirely.

The expression "adjacent" means closely attaching the sound absorbing and insulating material to the noise-generating device, providing it with a distance from the noise-generating device, or molding it as a part of the noise-generating device. The expression adjacent also includes mounting the sound absorbing and insulating material to a member connected to the noise-generating device (e.g., another sound absorbing and insulating material).

Figure 2A:
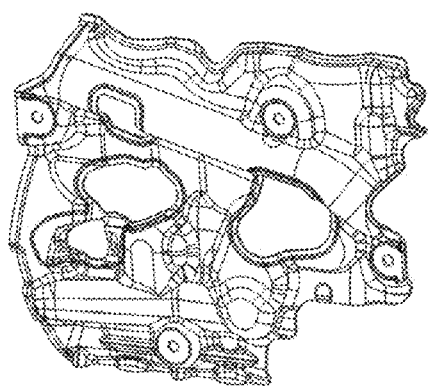
FIGS. 2A-2B schematically show an example of a sound absorbing and insulating material applied to a noise-generating device of an automobile after molding as a part.
Figure 2B:
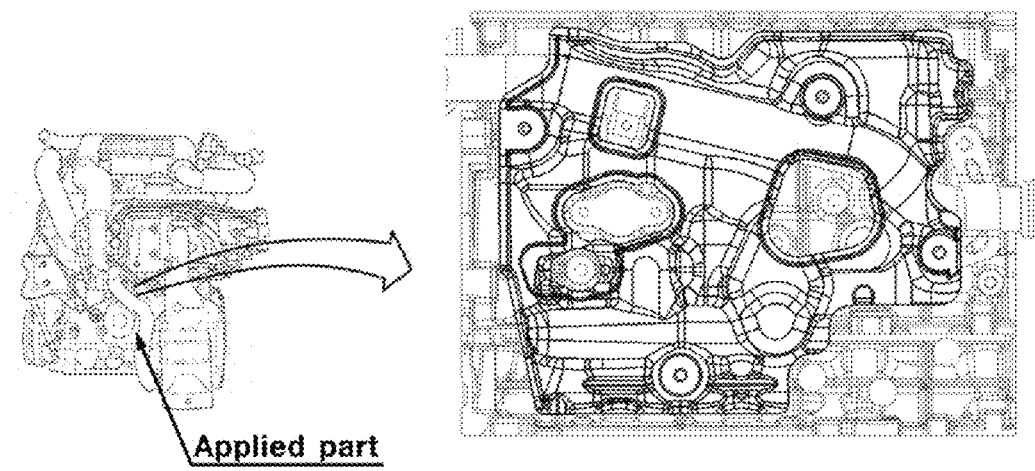

FIGS. 2A-2B and FIG. 3 schematically show representative examples wherein the sound absorbing and insulating material of the present invention is applied to a noise-generating device of an automobile.

FIGS. 2A-2B schematically show an example wherein a sound absorbing and insulating material is molded as a part and applied to a noise-generating device of an automobile. FIG. 2A is an image of a sound absorbing and insulating material molded to be used in an automobile engine, and FIG. 2B shows an example wherein the sound absorbing and insulating material is applied in a part of an automobile engine.

Figure 3A:
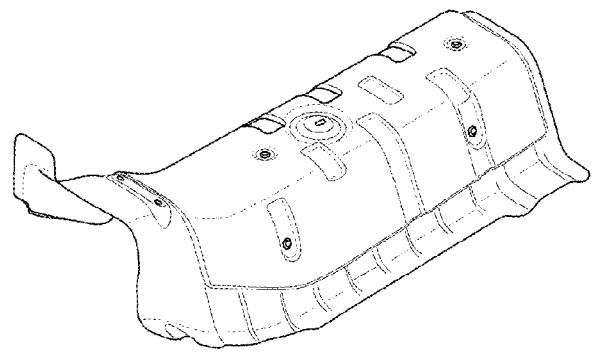
FIGS. 3A-3B schematically show an example wherein a sound absorbing and insulating material is applied to noise-generating device of an automobile with some distance.
Figure 3B:
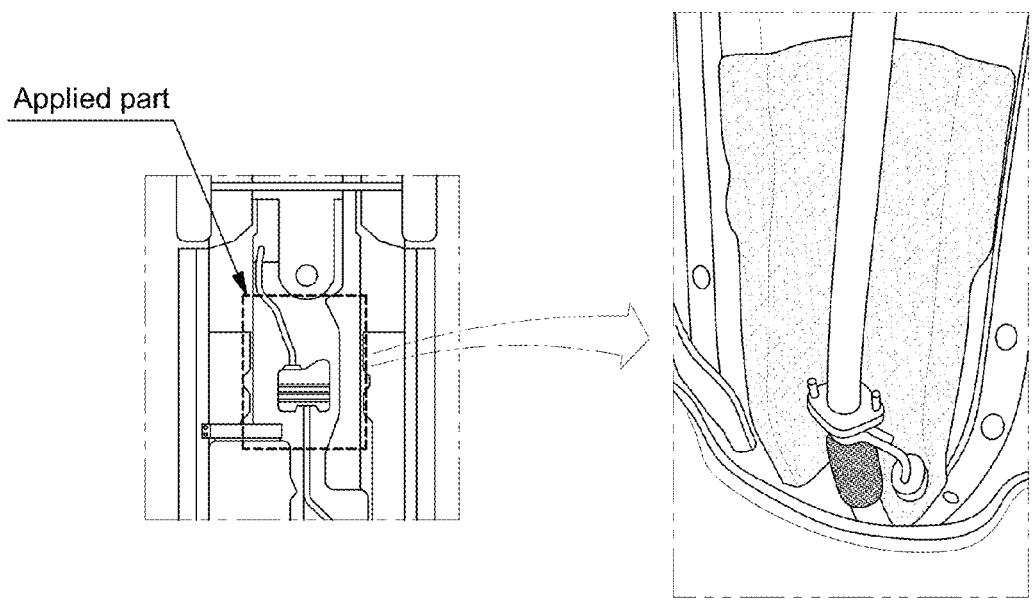

FIGS. 3A-3B schematically shows an example wherein a sound absorbing and insulating material is applied to a noise-generating device of an automobile. FIG. 3A is an image of a sound absorbing and insulating material molded to be used in a lower part of an automobile, and FIG. 3B shows an example wherein the sound absorbing and insulating material is attached to a lower part of an automobile.

As described above, the sound absorbing and insulating material of the present invention, wherein the polyimide binder is impregnated to maintain the three-dimensional structure inside the nonwoven fabric, has superior sound-absorbing property, flame retardancy, heat resistance and heat-insulating property. Accordingly, it can exhibit the desired sound-absorbing performance when directly applied to a noise-generating device maintained at high temperatures of 200° C. or above, to say nothing of room temperature, without deformation.

EXAMPLES

Hereinafter, the present invention is described in more detail through examples. However, the scope of the present invention is not limited by the examples.

Examples

Preparation of Sound Absorbing and Insulating Material

Example 1

Preparation of Sound Absorbing and Insulating Material Using Polyimide Resin-Impregnated Aramid Nonwoven Fabric A short aramid fiber having a limiting oxygen index (LOI) of 40% and a heat resistance temperature of 300° C. was air blown and formed into a web of 30 g/m² through carding. The web was stacked by overlapping 10-fold on a conveyor belt operated at 5 m/min using a horizontal wrapper. An aramid nonwoven fabric having a density of 300 g/m² and a thickness of 6 mm was prepared by continuously performing up-down needling, down-up needling and up-down needling with a needle stroke of 150 times/m².

The prepared nonwoven fabric was immersed in a binder solution. The binder solution was a solution in which a polyamic acid prepolymer polymerized from pyromellitic dianhydride and 4,4-oxydianiline is dispersed in an N-methyl-2-pyrrolidone solvent at a concentration of 15 wt % based on the content of the polyamic acid.

The nonwoven fabric was taken out from the binder solution and compressed using a roller at a pressure of 8 kgf/cm². As a result, a polyamic acid-impregnated nonwoven fabric having a density of 1,500 g/m² was obtained.

The polyamic acid-impregnated nonwoven fabric was molded into a desired shape by curing at 200° C. for 2 minutes. Then, a sound absorbing and insulating material wherein a polyimide represented by Chemical Formula 5 is impregnated in the aramid nonwoven fabric was prepared by imidizing the polyamic acid at 300° C.

[Chemical Formula 5]

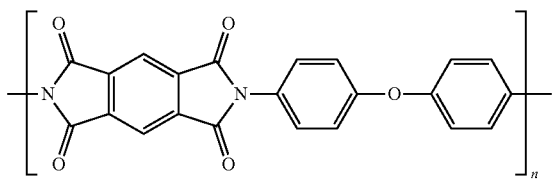

The polyimide represented by Chemical Formula 5 impregnated into the nonwoven fabric has a weight-average molecular weight of 20,000 g/mol and the final content of the polyimide was 50 parts by weight based on 100 parts by weight of the nonwoven fabric.

Comparative Example 1. Preparation of Sound Absorbing and Insulating Material Using Aramid Nonwoven Fabric An aramid nonwoven fabric having a density of 300 g/m² and a thickness of 6 mm was prepared by needle punching as described in Example 1 for use as a sound absorbing and insulating material.

Comparative Example 2. Preparation of Sound Absorbing and Insulating Material Using Polyimide Resin-Coated Aramid Nonwoven Fabric An aramid nonwoven fabric having a density of 300 g/m² and a thickness of 6 mm was prepared by needle punching as described in Example 1. A solution containing a polyimide resin was coated on the surface of the nonwoven fabric and a sound absorbing and insulating material was prepared by drying and molding the nonwoven fabric at 150° C. The coating amount was 50 parts by weight based on 100 parts by weight of the nonwoven fabric.

Comparative Example 3. Preparation of Sound Absorbing and Insulating Material Using Thermoplastic Resin-Impregnated Aramid Nonwoven Fabric An aramid nonwoven fabric having a density of 300 g/m² and a thickness of 6 mm was prepared by needle punching as described in Example 1. The nonwoven fabric was immersed in a binder solution, dried and then molded for use as a sound absorbing and insulating material.

The binder solution was a thermoplastic resin solution containing 10 wt % of polyethylene (PE) resin, 10 wt % of melamine cyanurate and 80 wt % of dimethyl carbonate (DMC).

Comparative Example 4. Preparation of Sound Absorbing and Insulating Material Using Polyimide Resin-Impregnated PET Nonwoven Fabric A polyethylene terephthalate (PET) nonwoven fabric having a density of 300 g/m² and a thickness of 6 mm was prepared by needle punching as described in Example 1. The nonwoven fabric was immersed in a binder solution, dried and then molded for use as a sound absorbing and insulating material.

The PET nonwoven fabric prepared in Comparative Example 4 was thermally deformed due to the reaction heat produced during the curing of polyimide and could not be molded into a desired shape because it was completely thermally deformed during the drying and thermal molding processes.

Test Examples

Evaluation of Physical Properties of Sound Absorbing and Insulating Materials

The physical properties of the sound absorbing and insulating materials were measured and compared as follows.

1. Evaluation of Heat Resistance

To evaluate heat resistance, the sound absorbing and insulating material was aged in an oven at 300° C. for 300 hours. After keeping at standard state (temperature 23±2° C., 50±5% relative humidity) for at least 1 hour, appearance was inspected and tensile strength was measured. It was visually inspected whether there were shrinkage or deformation, surface peeling, fluffing and cracking. The tensile strength was measured using a dumbbell-type No. 1 for randomly selected five sheets of test samples at a speed of 200 mm/min under a standard condition.

2. Evaluation of Thermal Cycle

The durability of the sound absorbing and insulating material was evaluated by the thermal cycle test method. The durability was determined after performing five cycles under the following conditions.

1) Condition of One Cycle

Room temperature→high temperature (150° C.×3 hr)→room temperature→low temperature (−30° C.×3 hr)→room temperature→humid condition (50° C.×95% RH).

2) Durability Evaluation Standard

After the thermal cycle test, the change in appearance was inspected. For example, surface damage, swelling, breaking and discoloring were inspected. If there was no change in appearance, the sound absorbing and insulating material was evaluated as 'no abnormality'.

3. Evaluation of Flame Retardancy

The flame retardancy of the sound absorbing and insulating material was measured according to the ISO 3795 flammability test method.

4. Evaluation of Nonflammability

The nonflammability of the sound absorbing and insulating material was measured according to the UL94 vertical burn test.

5. Evaluation of Sound-Absorbing Property

The sound-absorbing property of the sound absorbing and insulating material was measured according to the ISO 354 method.

6. Evaluation of Air Permeability

1) Evaluation Method

The test sample was mounted on a Frazier-type tester and the amount of air flowing through the sample vertically was measured. The area of the test sample through which the air passed was 5 cm$^2$ and the applied pressure was set to 125 pascal (Pa).

Test Example 1. Comparison of Properties of Sound Absorbing and Insulating Materials Depending on Heat-Resistant Fibers In Test Example 1, the physical properties of sound absorbing and insulating materials prepared with different heat-resistant fiber yarns were compared. Nonwoven fabrics having a density of 300 g/m$^2$ and a thickness of 6 mm were prepared by needle punching as described in Example 1 using the fiber yarns described in Table 1. Then, sound absorbing and insulating materials were prepared by immersing the nonwoven fabrics in binder solutions in which polyamic acid was dispersed and performing imidization after taking them out from the binder solutions.

The physical properties of the prepared sound absorbing and insulating materials were measured as described above. The result of measuring the properties of the sound absorbing and insulating materials prepared with different heat-resistant fibers is shown in Table 2.

TABLE 1

| | | Yarn 1 | Yarn 2 | Yarn 3 | Yarn 4 | Yarn 5 |
|---|---|---|---|---|---|---|
| Yarns | Yarn material | Aramid | PI | PBI | PBO | oxi-PAN |
| | Limiting oxygen index | 40 | 50 | 40 | 60 | 65 |
| | Heat resistance temperature (° C. × 1 hr) | 300 | 300 | 300 | 300 | 300 |
| Heat resistance | Appearance | No abnormality | No abnormality | No abnormality | No abnormality | No abnormality |
| | Tensile strength (Kgf/cm$^2$) | 200 | 220 | 200 | 210 | 210 |
| Thermal cycle | Appearance | No abnormality | No abnormality | No abnormality | No abnormality | No abnormality |
| | Flame retardancy | Self-extinguishing | Self-extinguishing | Self-extinguishing | Self-extinguishing | Self-extinguishing |
| | Nonflammability | Nonflammable | Nonflammable | Nonflammable | Nonflammable | Nonflammable |

TABLE 2

| | Sound-absorbing rate | | | | |
|---|---|---|---|---|---|
| Frequency (Hz) | Yarn 1 (aramid) | Yarn 2 (PI) | Yarn 3 (PBI) | Yarn 4 (PBO) | Yarn 5 (oxi-PAN) |
| 400 | 0.08 | 0.06 | 0.07 | 0.08 | 0.08 |
| 500 | 0.10 | 0.08 | 0.08 | 0.10 | 0.09 |
| 630 | 0.16 | 0.15 | 0.14 | 0.14 | 0.13 |
| 800 | 0.23 | 0.20 | 0.22 | 0.21 | 0.22 |
| 1000 | 0.35 | 0.29 | 0.30 | 0.34 | 0.35 |
| 1250 | 0.44 | 0.39 | 0.33 | 0.40 | 0.45 |
| 1600 | 0.59 | 0.50 | 0.49 | 0.53 | 0.57 |
| 2000 | 0.70 | 0.69 | 0.70 | 0.69 | 0.68 |
| 2500 | 0.79 | 0.75 | 0.77 | 0.74 | 0.80 |
| 3150 | 0.83 | 0.80 | 0.82 | 0.84 | 0.85 |
| 4000 | 0.86 | 0.82 | 0.85 | 0.87 | 0.88 |
| 5000 | 0.99 | 0.89 | 0.92 | 0.91 | 0.92 |
| 6300 | 0.98 | 0.93 | 0.94 | 0.94 | 0.98 |
| 8000 | 0.99 | 0.98 | 0.98 | 0.98 | 0.89 |
| 10000 | 0.98 | 0.98 | 0.99 | 0.98 | 0.99 |

As seen from Table 1 and Table 2, all the sound absorbing and insulating materials prepared using heat-resistant fibers having a limiting oxygen index of 25% or greater and a heat resistance temperature of 150° C. or greater as presented by the present invention exhibited satisfactory heat resistance, durability, flame retardancy, nonflammability and sound-absorbing property. Accordingly, it was confirmed that conventional heat-resistant fibers known as super fiber can be used as the material of the nonwoven fabric of the sound absorbing and insulating material according to the present invention.

Test Example 2. Comparison of Properties of Sound Absorbing and Insulating Materials Depending on Density of Nonwoven Fabric In Test Example 2, polyimide-impregnated sound absorbing and insulating materials were prepared in the same manner as in Example 1 using nonwoven fabrics having different densities. The sound-absorbing performance of the prepared sound absorbing and insulating materials is shown in FIG. 4.

Figure 4:
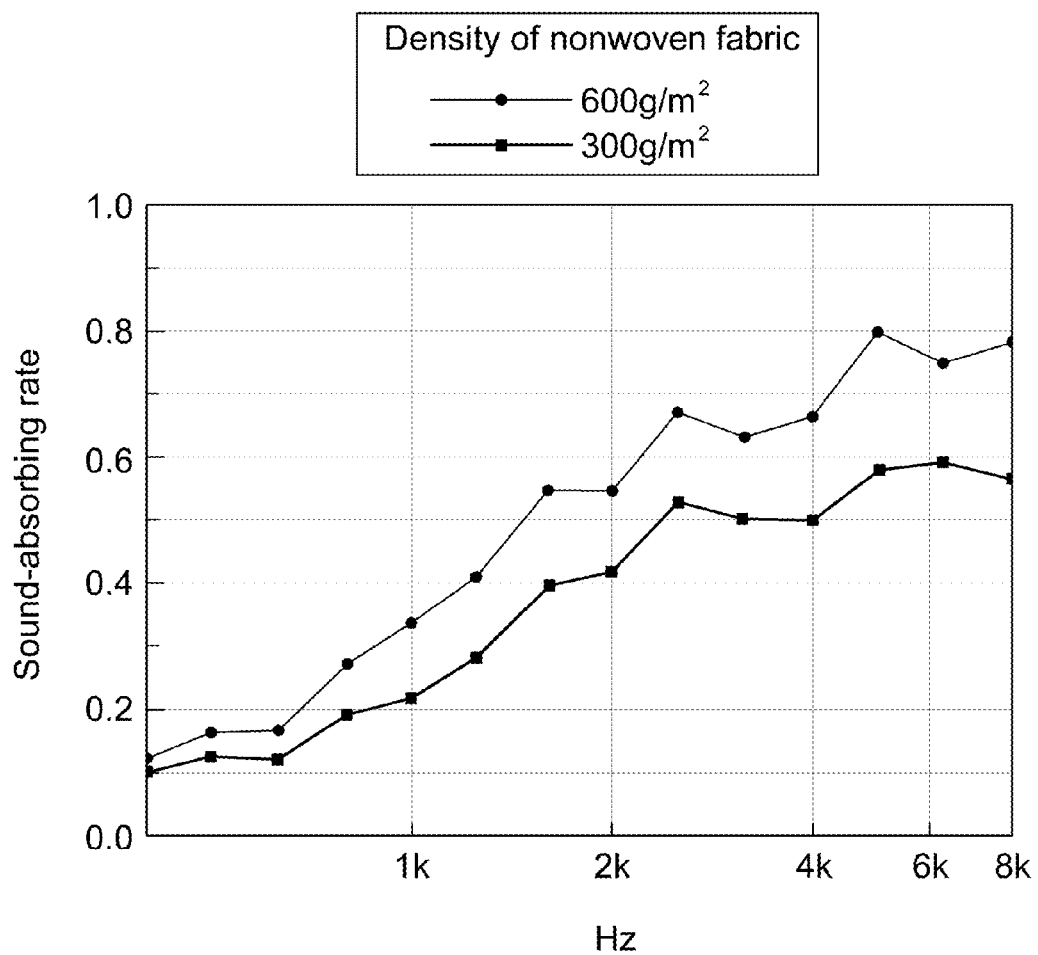
FIG. 4 is a graph comparing the sound-absorbing performance of a sound absorbing and insulating material depending on the density of a nonwoven fabric.

As seen from FIG. 4, the sound-absorbing performance of the sound absorbing and insulating material was superior when a nonwoven fabric having a density of 600 g/m$^2$ was used than when a nonwoven fabric having a density of 300 g/m$^2$ was used.

Test Example 3. Evaluation of Physical Properties of Sound Absorbing and Insulating Materials In Test Example 3, the properties of sound absorbing and insulating materials depending on the method by which a binder was applied to a nonwoven fabric formed of a heat-resistant fiber were compared.

That is to say, the sound-absorbing rate of the sound absorbing and insulating materials prepared by impregnating (Example 1) and coating (Comparative Example 2) the polyimide (PI) binder into the aramid nonwoven fabric was compared. The result of measuring the sound-absorbing rate of the sound absorbing and insulating material formed of an aramid nonwoven fabric (Comparative Example 1), the sound absorbing and insulating material formed of an aramid nonwoven fabric on which PI was coated (Comparative Example 2) and the sound absorbing and insulating material formed of an aramid nonwoven fabric into which PI was impregnated (Example 1) is shown in Table 3.

TABLE 3

| | Sound-absorbing rate | | |
|---|---|---|---|
| Frequency (Hz) | Comparative Example 1 nonwoven (fabric) | Comparative Example 2 (PI-coated nonwoven fabric) | Example 1 (PI-impregnated nonwoven fabric) |
| 400 | 0.01 | 0.01 | 0.04 |
| 500 | 0.03 | 0.03 | 0.08 |
| 630 | 0.12 | 0.06 | 0.16 |
| 800 | 0.16 | 0.09 | 0.23 |
| 1000 | 0.26 | 0.22 | 0.34 |
| 1250 | 0.32 | 0.19 | 0.38 |
| 1600 | 0.39 | 0.27 | 0.52 |
| 2000 | 0.48 | 0.29 | 0.66 |
| 2500 | 0.64 | 0.44 | 0.78 |
| 3150 | 0.63 | 0.50 | 0.82 |
| 4000 | 0.72 | 0.70 | 0.86 |
| 5000 | 0.80 | 0.77 | 0.89 |
| 6300 | 0.78 | 0.79 | 0.98 |
| 8000 | 0.89 | 0.89 | 0.98 |
| 10000 | 0.90 | 0.96 | 0.98 |

As seen from Table 3, the sound absorbing and insulating material of Example 1 according to the present invention showed superior sound-absorbing rate in all frequency ranges as compared to the sound absorbing and insulating material of Comparative Example 1 wherein the nonwoven fabric not containing PI was used. In contrast, the sound absorbing and insulating material of Comparative Example 2 wherein the PI-coated nonwoven fabric was used showed lower sound-absorbing rate than the nonwoven fabric (Comparative Example 1) in the frequency range of 400-5000 Hz.

Test Example 4. Evaluation of Heat-Insulating Performance of Sound Absorbing and Insulating Materials In Test Example 4, the heat-insulating performance of the sound absorbing and insulating materials prepared in Example 1 (PI-impregnated aramid nonwoven fabric), Comparative Example 1 (aramid nonwoven fabric) and Comparative Example 3 (PE-impregnated aramid nonwoven fabric) was evaluated. After applying heat of 1000° C. from one side of a 25-mm thick sample of each sound absorbing and insulating material for 5 minutes, temperature was measured on the opposite side of the sample.

The temperature measured on the opposite side of the sound absorbing and insulating material was 250° C. for the sound absorbing and insulating material of Example 1 and 350° C. for the sound absorbing and insulating material of Comparative Example 1. Accordingly, it was confirmed that the sound absorbing and insulating material of the present invention wherein the thermosetting resin was impregnated exhibits improved heat-insulating performance. In contrast, the thermoplastic resin-impregnated sound absorbing and insulating material of Comparative Example 3 melted down and deformed as soon as the heat of 1000° C. was applied.

Accordingly, it can be seen that the sound absorbing and insulating material of the present invention has very superior heat-insulating property.

Test Example 5. Comparison of Heat-Insulating Performance with Aluminum Heat-Insulating Plate In Test Example 5, the heat-insulating performance of the sound absorbing and insulating material of Example 1 was compared with that of an aluminum heat-insulating plate. While applying the same heat from one side of the sound absorbing and insulating material and the heat-insulating plate at 250° C., the temperature at the opposite side was measured with time. The result is shown in FIG. 5.

Figure 5:
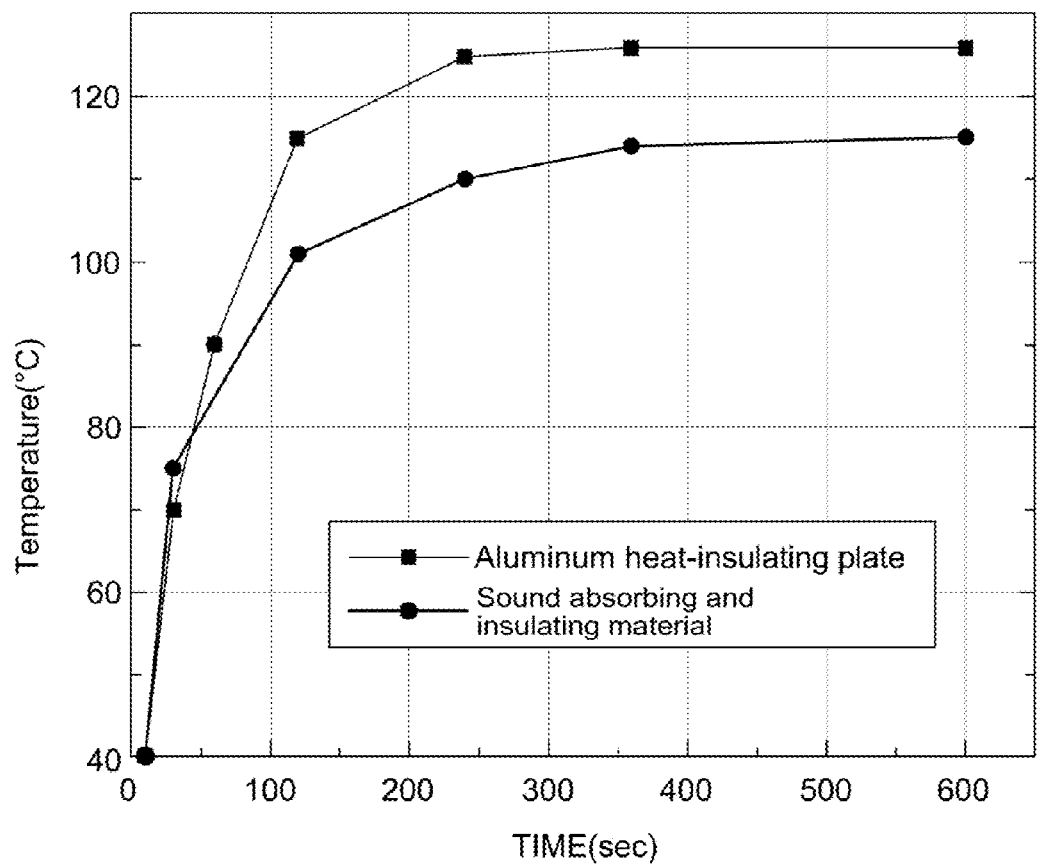
FIG. 5 is a graph comparing the heat-insulating performance of an aluminum heat-insulating plate with that of a sound absorbing and insulating material of the present invention.

As seen from FIG. 5, the sound absorbing and insulating material according to the present invention showed better heat-insulating performance with the heat resistance temperature at least 11° C. lower as compared to the aluminum heat-insulating plate.

Test Example 6. Comparison of Properties of Sound Absorbing and Insulating Material Depending on Binder Content Sound absorbing and insulating materials were prepared in the same manner as in Example 1. The nonwoven fabric taken out from the binder solution was compressed and dried to have different final binder contents. The binder content was represented as parts by weight of the binder contained in the sound absorbing and insulating material based on 100 parts by weight of the dried nonwoven fabric.

The result of comparing the mechanical properties and sound-absorbing rate of the sound absorbing and insulating materials prepared with different binder contents is shown in Table 4 and Table 5.

TABLE 4

Physical properties of sound absorbing and insulating materials with different PI binder contents

| Binder content (parts by weight) | 0 | 10 | 50 | 100 | 200 |
|---|---|---|---|---|---|
| Air permeability (mL/cm$^2$ · s) | 500 | 370 | 350 | 320 | 210 |
| Tensile strength (kg/cm$^2$) | 40 | 65 | 220 | 260 | 340 |
| Nonflammability | Nonflammable | Nonflammable | Nonflammable | Nonflammable | Nonflammable |

TABLE 5

Sound-absorbing rate of sound absorbing and insulating materials with different PI binder contents

| Frequency (Hz) | 0 parts by weight | 10 parts by weight | 50 parts by weight | 100 parts by weight | 200 parts by weight |
|---|---|---|---|---|---|
| 400 | 0.01 | 0.01 | 0.08 | 0.06 | 0.02 |
| 500 | 0.03 | 0.04 | 0.10 | 0.09 | 0.04 |
| 630 | 0.12 | 0.14 | 0.16 | 0.15 | 0.09 |
| 800 | 0.16 | 0.17 | 0.22 | 0.25 | 0.11 |
| 1000 | 0.26 | 0.26 | 0.35 | 0.29 | 0.14 |
| 1250 | 0.32 | 0.34 | 0.43 | 0.41 | 0.16 |
| 1600 | 0.39 | 0.40 | 0.58 | 0.54 | 0.23 |
| 2000 | 0.48 | 0.51 | 0.70 | 0.58 | 0.38 |
| 2500 | 0.64 | 0.68 | 0.79 | 0.67 | 0.43 |
| 3150 | 0.63 | 0.69 | 0.80 | 0.71 | 0.53 |
| 4000 | 0.72 | 0.77 | 0.86 | 0.75 | 0.53 |
| 5000 | 0.80 | 0.83 | 0.99 | 0.79 | 0.57 |
| 6300 | 0.78 | 0.88 | 0.98 | 0.80 | 0.63 |
| 8000 | 0.89 | 0.91 | 0.99 | 0.92 | 0.73 |
| 10000 | 0.90 | 0.92 | 0.98 | 0.92 | 0.80 |

As seen from Table 4 and Table 5, the sound-absorbing rate was improved as the polyimide binder was impregnated into the nonwoven fabric when compared with the nonwoven fabric not impregnated with the polyimide binder. Also, it was confirmed that the sound-absorbing rate of the sound absorbing and insulating material could be controlled with the polyimide binder content.

Test Example 7. Comparison of Properties of Sound Absorbing and Insulating Material Depending on Binders Sound absorbing and insulating materials wherein 50 parts by weight of a binder was impregnated based on 100 parts by weight of an aramid nonwoven fabric were prepared in the same manner as in Example 1. The resins described in Table 6 were used as the binder.

The result of comparing the mechanical properties and sound-absorbing rate of the sound absorbing and insulating materials prepared with different binders is shown in Table 6.

TABLE 6

Physical properties of sound absorbing and insulating materials with different binders

| Binder resin | Epoxy resin | Phenol resin | Urea resin | Melamine resin | Polyurethane resin |
|---|---|---|---|---|---|
| Heat resistance temperature (° C. × 1 hr) | 300 | 260 | 190 | 300 | 200 |
| Tensile strength (kg/cm$^2$) | 200 | 165 | 180 | 180 | 170 |
| Flame retardancy | Self-extinguishing | Self-extinguishing | Self-extinguishing | Self-extinguishing | Self-extinguishing |
| Nonflammability | Nonflammable | Nonflammable | Nonflammable | Nonflammable | Nonflammable |

What is claimed is:

1. A sound absorbing and insulating material comprising: a nonwoven fabric comprising 30-100 wt % of a heat-resistant fiber having a fineness of 1-15 denier; and a polyimide binder impregnated into the nonwoven fabric and present in the same layer as the nonwoven fabric, being distributed and attached on a yarn surface of the nonwoven fabric and maintaining a three-dimensional structure inside the nonwoven fabric by maintaining or further forming micro cavities of the nonwoven fabric.

2. The sound absorbing and insulating material according to claim 1, wherein the heat-resistant fiber has a limiting oxygen index (LOI) of 25% or greater and a heat resistance temperature of 150° C. or greater.

3. The sound absorbing and insulating material according to claim 2, wherein the heat-resistant fiber is one or more selected from a group consisting of an aramid fiber, an oxidized polyacrylonitrile (oxi-PAN) fiber, a polyimide (PI) fiber, a polybenzimidazole (PBI) fiber, a polybenzoxazole (PBO) fiber, a metallic fiber, a carbon fiber, a glass fiber, a basalt fiber, a silica fiber and a ceramic fiber.

4. The sound absorbing and insulating material according to claim 3, wherein the heat-resistant fiber is an aramid fiber or an oxidized polyacrylonitrile (oxi-PAN) fiber having a fineness of 1-15 denier and a yarn length of 20-100 mm.

5. The sound absorbing and insulating material according to claim 1, wherein the nonwoven fabric has a thickness of 3-20 mm and a density of 100-2000 g/m$^2$.

6. The sound absorbing and insulating material according to claim 1, wherein the polyimide has a weight-average molecular weight of 10,000-200,000 g/mol.

7. The sound absorbing and insulating material according to claim 1, wherein 1-300 parts by weight of the polyimide binder is impregnated based on 100 parts by weight of the nonwoven fabric.

8. The sound absorbing and insulating material according to claim 1, wherein the sound absorbing and insulating material is molded to correspond to a three-dimensional shape of an object to which the sound absorbing and insulating material is applied.

9. The sound absorbing and insulating material according to claim 1, wherein the sound absorbing and insulating material is formed as a single layer or multiple layers.

10. The sound absorbing and insulating material according to claim 1, wherein the sound absorbing and insulating material is for an automobile.

11. A method for manufacturing the sound absorbing and insulating material according to claim 1, comprising:
   a) immersing a nonwoven fabric comprising 30-100 wt % of a heat-resistant fiber having a fineness of 1-15 denier in a binder solution in which polyamic acid is dispersed;
   b) recovering the polyamic acid-impregnated nonwoven fabric from the binder solution; and
   c) converting the polyamic acid to polyimide by curing the recovered nonwoven fabric.

12. The method for manufacturing the sound absorbing and insulating material according to claim 11, which further comprises, after b), molding the polyamic acid-impregnated nonwoven fabric into a desired shape.

13. The method for manufacturing the sound absorbing and insulating material according to claim 11, wherein b) comprises taking out and compressing the polyamic acid-impregnated nonwoven fabric at a pressure of 1-20 kgf/cm$^2$, taking out the polyamic acid-impregnated nonwoven fabric and evaporating a solvent by heating at a temperature of 70-200° C. or taking out and compressing the polyamic acid-impregnated nonwoven fabric and evaporating a solvent under the said temperature and pressure conditions.

14. The method for manufacturing the sound absorbing and insulating material according to claim 11, wherein the sound absorbing and insulating material has 1-300 parts by weight of a polyimide binder impregnated therein based on 100 parts by weight of the nonwoven fabric.

15. The method for manufacturing the sound absorbing and insulating material according to claim 11, wherein the heat-resistant fiber has a limiting oxygen index (LOI) of 25% or greater and a heat resistance temperature of 150° C. or greater.

16. The method for manufacturing the sound absorbing and insulating material according to claim 15, wherein the heat-resistant fiber is one or more selected from a group consisting of an aramid fiber, an oxidized polyacrylonitrile (oxi-PAN) fiber, a polyimide (PI) fiber, a polybenzimidazole (PBI) fiber, a polybenzoxazole (PBO) fiber, a metallic fiber, a carbon fiber, a glass fiber, a basalt fiber, a silica fiber and a ceramic fiber.

17. The method for manufacturing the sound absorbing and insulating material according to claim 16, wherein the heat-resistant fiber is an aramid fiber or an oxidized polyacrylonitrile (oxi-PAN) fiber having a fineness of 1-15 denier and a yarn length of 20-100 mm.

18. The method for manufacturing the sound absorbing and insulating material according to claim 11, wherein the nonwoven fabric has a thickness of 3-20 mm and a density of 100-2000 g/m$^2$.

19. The method for manufacturing the sound absorbing and insulating material according to claim 18, wherein the nonwoven fabric is formed by continuously performing up-down needling, down-up needling and up-down needling.

20. The method for manufacturing the sound absorbing and insulating material according to claim 18, wherein the nonwoven fabric is formed with a needle stroke of 30-350 times/m$^2$.

21. The method for manufacturing the sound absorbing and insulating material according to claim 11, wherein the polyimide has a weight-average molecular weight of 20,000-300,000 g/mol.

22. The method for manufacturing the sound absorbing and insulating material according to claim 11, wherein the concentration of the binder solution is 1-60 wt % based on the content of the polyamic acid.

23. The method for manufacturing the sound absorbing and insulating material according to claim 11, wherein the sound absorbing and insulating material is for an automobile.

24. A method for reducing noise of a noise-generating device, comprising:
   i) checking a three-dimensional shape of a noise-generating device;
   ii) preparing and molding the sound absorbing and insulating material according to any of claims 1 to 10 so as to correspond to the three-dimensional shape of the device partially or entirely; and
   iii) bringing the sound absorbing and insulating material adjacent to the noise-generating device.

25. The method for reducing noise of a noise-generating device according to claim 24, wherein the device is a motor, an engine or an exhaust system.

26. The method for reducing noise of a noise-generating device according to claim 24, wherein the sound absorbing and insulating material is brought adjacent to the noise-generating device by attaching the sound absorbing and insulating material to the noise-generating device, providing the sound absorbing and insulating material with a distance from the noise-generating device, or molding the sound absorbing and insulating material as a part of the noise-generating device.

* * * * *